(12) United States Patent
Chen et al.

(10) Patent No.: US 10,187,654 B2
(45) Date of Patent: Jan. 22, 2019

(54) METHOD AND DEVICE FOR FORWARD MULTIPLE-HYPOTHESIS ENCODING/DECODING OF IMAGE BLOCK

(71) Applicant: SAMSUNG ELECTRONICS CO., LTD., Suwon-si (KR)

(72) Inventors: Jie Chen, Beijing (CN); Lu Yu, Hangzhou (CN); Yong Ling, Hangzhou (CN); Zhenjiang Shao, Hangzhou (CN); Xingguo Zhu, Hangzhou (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 207 days.

(21) Appl. No.: 15/184,289

(22) Filed: Jun. 16, 2016

(65) Prior Publication Data

US 2016/0301947 A1 Oct. 13, 2016

Related U.S. Application Data

(63) Continuation of application No. PCT/KR2014/012383, filed on Dec. 16, 2014.

(30) Foreign Application Priority Data

Dec. 16, 2013 (CN) .......................... 2013 1 0689790

(51) Int. Cl.
*H04N 19/176* (2014.01)
*H04N 19/523* (2014.01)
(Continued)

(52) U.S. Cl.
CPC ......... *H04N 19/523* (2014.11); *H04N 19/176* (2014.11); *H04N 19/182* (2014.11);
(Continued)

(58) Field of Classification Search
CPC ....... E06B 2009/585; E06B 2009/6836; E06B 9/17046; E06B 9/58; H04N 19/176;
(Continued)

(56) References Cited

U.S. PATENT DOCUMENTS 5,459,515 A * 10/1995 Chevance ............ H04N 19/176
348/402.1
6,807,231 B1 * 10/2004 Wiegand ................ H04N 19/51
375/240.12
(Continued)

FOREIGN PATENT DOCUMENTS

CN 101605256 A 12/2009
CN 102934440 A 2/2013
(Continued)

OTHER PUBLICATIONS

Ma et al, A multi-hypothesis decoder for multiple description video coding (Year: 2008).*

(Continued)

*Primary Examiner* — Shan E Elahi
(74) *Attorney, Agent, or Firm* — Sughrue Mion, PLLC (57) ABSTRACT

The present disclosure provides a forward multiple-hypothesis encoding/decoding method of an image block. In this method, motion information of a current block including two forward reference frame indexes and two motion vectors are selectively encoded into a bit-stream based on a current encoding mode. The motion information which is not encoded into the bit-stream is derived at a decoder by a predefined rule. This method sufficiently utilizes correlation within motion information of an image block and correlation between the motion information of the current image block and that of an adjacent image block.

6 Claims, 3 Drawing Sheets

(51) Int. Cl.
  *H04N 19/52* (2014.01)
  *H04N 19/593* (2014.01)
  *H04N 19/573* (2014.01)
  *H04N 19/182* (2014.01)
  *H04N 19/70* (2014.01)

(52) U.S. Cl.
  CPC ........... *H04N 19/52* (2014.11); *H04N 19/573* (2014.11); *H04N 19/593* (2014.11); *H04N 19/70* (2014.11)

(58) Field of Classification Search
  CPC .... H04N 19/182; H04N 19/52; H04N 19/523; H04N 19/573; H04N 19/593; H04N 19/70
  USPC ............................. 375/240.17, 240.18, 240.16
  See application file for complete search history.

(56) References Cited

U.S. PATENT DOCUMENTS

| | | | |
|---|---|---|---|
| 7,801,217 B2 | 9/2010 | Boyce | |
| 8,228,994 B2* | 7/2012 | Wu | H04N 19/597 348/207.99 |
| 8,526,499 B2 | 9/2013 | Jeon et al. | |
| 8,873,626 B2 | 10/2014 | Karczewicz et al. | |
| 8,879,620 B2* | 11/2014 | Lin | H04N 19/139 375/240 |
| 8,891,608 B2* | 11/2014 | Lin | H04N 19/139 375/240 |
| 9,118,929 B2 | 8/2015 | Lin et al. | |
| 9,137,546 B2 | 9/2015 | Won et al. | |
| 9,215,475 B2* | 12/2015 | Tourapis | H04N 19/56 |
| 2006/0133486 A1 | 6/2006 | Boyce | |
| 2006/0262856 A1* | 11/2006 | Wu | H04N 19/597 375/240.19 |
| 2007/0211802 A1 | 9/2007 | Kikuchi et al. | |
| 2009/0067505 A1* | 3/2009 | Tourapis | H04N 19/56 375/240.16 |
| 2011/0142132 A1* | 6/2011 | Tourapis | H04N 19/597 375/240.16 |
| 2011/0255600 A1* | 10/2011 | Lin | H04N 19/139 375/240.16 |
| 2012/0027097 A1* | 2/2012 | Lin | H04N 19/139 375/240.16 |
| 2012/0230392 A1* | 9/2012 | Zheng | H04N 19/197 375/240.02 |
| 2013/0176390 A1 | 7/2013 | Chen et al. | |
| 2013/0188717 A1* | 7/2013 | Chen | H04N 19/00684 375/240.16 |
| 2013/0188718 A1* | 7/2013 | Chen | H04N 19/00684 375/240.16 |
| 2013/0188719 A1* | 7/2013 | Chen | H04N 19/00684 375/240.16 |
| 2013/0272377 A1* | 10/2013 | Karczewicz | H03M 7/30 375/240.02 |
| 2013/0322534 A1* | 12/2013 | Demos | H04N 19/147 375/240.13 |
| 2014/0044179 A1* | 2/2014 | Li | H04N 19/597 375/240.16 |
| 2014/0161186 A1* | 6/2014 | Zhang | H04N 19/597 375/240.16 |
| 2014/0254682 A1* | 9/2014 | Chen | H04N 19/597 375/240.16 |
| 2014/0294078 A1* | 10/2014 | Seregin | H04N 19/176 375/240.15 |
| 2014/0301467 A1* | 10/2014 | Thirumalai | H04N 19/597 375/240.16 |
| 2015/0229958 A1 | 8/2015 | Lim et al. | |
| 2016/0330444 A1 | 11/2016 | Lim et al. | |
| 2017/0230666 A1* | 8/2017 | Tourapis | H04N 19/139 |

FOREIGN PATENT DOCUMENTS

| | | | | |
|---|---|---|---|---|
| CN | 103024378 A | 4/2013 | | |
| CN | 103338372 A | 10/2013 | | |
| JP | 200423458 A | 1/2004 | | |
| KR | 1020080110454 A | 12/2008 | | |
| KR | 1020100041393 A | 4/2010 | | |
| KR | 1020120042910 A | 5/2012 | | |
| KR | 1020120126115 A | 11/2012 | | |
| KR | 1020130090785 A | 8/2013 | | |
| RU | 2335860 C2 | 10/2008 | | |
| WO | 2004032506 A1 | 4/2004 | | |
| WO | WO-2004032506 A1 * | 4/2004 | | H04N 19/577 |
| WO | 2005067297 A1 | 7/2005 | | |

OTHER PUBLICATIONS

Communication (PCT/ISA/220) dated Feb. 25, 2015, issued by the International Searching Authority in counterpart International Application No. PCT/KR2014/012383.

Search Report and Written Opinion (PCT/ISA/210 & 237) dated Feb. 25, 2015, issued by the International Searching Authority in counterpart International Application No. PCT/KR2014/012383.

Communication dated Nov. 20, 2015, issued by the Korean Intellectual Property Office in counterpart Korean Application No. 10-2014-0181611.

Notice of Allowance dated May 3, 2016, issued by the Korean Intellectual Property Office in counterpart Korean Application No. 10-2014-0181611.

Communication dated Apr. 3, 2018, from the State Intellectual Property Office of People's Republic of China in counterpart Application No. 201410264885.6.

Communication dated Aug. 31, 2018, from the Russian Patent Office in counterpart application No. 2016128896/08.

* cited by examiner

METHOD AND DEVICE FOR FORWARD MULTIPLE-HYPOTHESIS ENCODING/DECODING OF IMAGE BLOCK

CROSS REFERENCE TO RELATED APPLICATIONS

This application is a continuation of International Patent Application No. PCT/KR2014/012383 filed on Dec. 16, 2014, which claims the benefit of Chinese Patent Application No. 201310689790.4 filed Dec. 16, 2013, the contents of which are incorporated herein in their entirety by reference.

TECHNICAL FIELD

The present disclosure relates to video image encoding/decoding and multimedia communications field, and more particularly, to a forward multiple-hypothesis encoding/decoding method and an apparatus thereof.

BACKGROUND ART

Video and image coding technique is a basis and a key point for wide applications of important multimedia information—digital video and image. In a current block-based hybrid video coding framework, video coding generally includes the following four parts: prediction coding, transform and quantization, entropy coding, and loop filtering. The prediction coding includes intra-frame prediction and inter-frame prediction. Within one frame of image, adjacent pixels have similar values. Therefore, a current pixel may be predicted according to spatially adjacent pixels. For a video sequence, images of adjacent frames are greatly correlated with each other in time domain, which forms a basis for the inter-prediction technique in theory. At present, existing video coding standards include MPEG-1/2/4, H.261/H.263, H.264/AVC, AVS-1/2 and H.265/HEVC. The block-based inter-prediction technique is also improved with the development of the video coding.

The block-based inter-prediction technique is mainly developed in two aspects: (1) precision of the prediction of the pixel becomes higher and higher, from whole pixel prediction to ½ pixel prediction, or from ¼ pixel prediction to ⅛ pixel prediction. (2) with the number of unidirectional reference blocks changing from 1 to 2, the number of the reference blocks is increased. Before H.264/HEVC and AVS 2.0, for each block, there is only one forward reference block. The pixels of the current block are predicted based on the forward reference block, and location information (reference frame index and motion vector MV) of the reference block and the forward reference block are encoded into the bit-stream. Such image block is referred to as a forward uni-hypothesis coded image block. In the H.264/HEVC and AVS2, forward multiple references prediction technique is involved. For each block, there are two forward reference blocks. After a weighted prediction to the pixels of the current block based on the two forward reference blocks, location information (two reference frame indexes and two MVs) of the reference blocks are encoded into the bit-stream. Such an image block with two reference blocks is referred to as a forward multiple-hypothesis encoded image block.

A multiple-hypothesis encoded image block has two reference image blocks. It is supposed that a current image block to be encoded is A and its corresponding reference image blocks are B and C. A prediction coding procedure of the image block A may be as follows: a weighted sum of the reference blocks B and C is calculated to obtain a prediction image block P and a prediction coding is performed to A based on P. The weighted sum may be described by a following formula:

$$P = \alpha \times C + (1-\alpha) \times B, \quad (1)$$

wherein $0<\alpha<1$, $\alpha$ may be a fixed value (e.g., $\alpha=0.5$) defined by an encoder/decoder or an video coding standard, or a value included in the bit-stream, or a value derived from a correlation among reference frames where the image blocks A, B and C are located. The above formula merely describes one example. However, it is not limited thereto. In the HEVC, for a multiple-hypothesis encoded image block, there is no direct relationship between two reference frame indexes corresponding to it. The two reference frame indexes may be the same or different.

There is also no direct relationship between two MVs corresponding to it. The two MVs may be the same or different. An encoder needs to write the two reference frame indexes and the two MVs into the bit-stream. In the AVS 2, the coding mode of the forward multiple-hypothesis encoded image block is referred to as directional multiple hypothesis (DMH) mode. The two reference frame indexes in this mode are the same and the difference between the two MVs is smaller than a threshold. Therefore, in this mode, what is needed to write into the bit-stream includes: one reference frame index, one MV and the difference between the two MVs. In order to facilitate the description, the reference frame index and the MV of an image block are referred to as motion information of the image block.

In order to further improve efficiency of the multiple-hypothesis prediction coding, characteristic of the multiple-hypothesis coded image block is analyzed. In the multiple-hypothesis prediction coding, it is found that there is a correlation between indexes of the two reference frame where the two reference blocks are located and the two MVs is not completely irrelevant, so the motion information of a current image block is greatly associated with the motion information of adjacent image blocks. Take the MV as an example, the MV of the current image block is closely relevant to the MV of a spatially/temporally adjacent image block. In some special cases, the MV of the current image block can be directly derived from the MV of the adjacent block and thus the MV of the current block is not needed to be transmitted in the bit-stream. At present, there are some MV derivation methods, e.g., median-based MV derivation, AMVP, Merge, edge length based MV derivation, etc., which are referred to as motion vector derivation method in general.

Figure 1A:
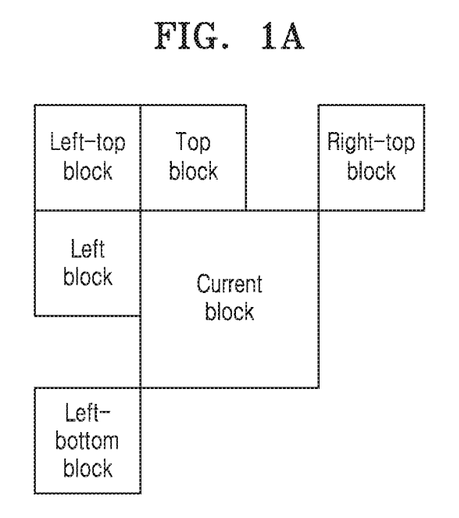
FIGS. 1A and 1B are schematic diagrams illustrating spatially and temporally adjacent blocks of a current block according to an embodiment of the present disclosure.
Figure 1B:
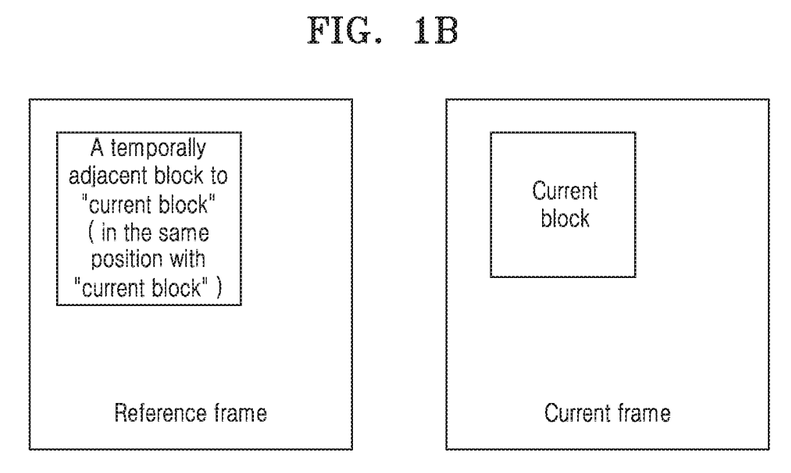

Temporally and spatially adjacent blocks of a current block are as shown in FIGS. 1A and 1B. There are 5 kinds of spatially adjacent blocks all together, as shown in FIG. 1A. A temporally adjacent block is a block which is in a former decoded frame and in the same position with the current block, as shown in FIG. 1B.

The MV of the current block derived from the MV of the adjacent block may also be derived based on the correlation between the reference frame indexes, which is referred to as a scaling MV derivation method.

A derivation rule of the scaling MV method includes: for a current block A, the motion vector corresponding to a reference block B in a reference frame F1 with an index RF1 is MV1. Thus, given a reference frame F2 with an index RF2, the motion vector MV2 of block A corresponding to a reference block C in the reference frame F2 may be derived by:

$$MV_2 = \frac{d_2}{d_1} \times MV_1, \qquad (2)$$

wherein d1 denotes a distance between the reference frame F1 and the current frame, d2 denotes a distance between the reference frame F2 and the current frame. It should be noted that, the motion vector MV has two components: x component MVx and y component MVy. Usually, MV={MVx, MVy}. Therefore, if the formula (2) is adopted to derive the MV, the two components are derived independently.

After the multiple-hypothesis coding idea is introduced, the multiple-hypothesis coded image block requires two reference blocks. For the encoder, two reference frame indexes and two corresponding motion vectors need to be found during a motion search procedure. A complete search may be adopted in this search procedure, i.e., each position of each frame in the reference queue is searched. Or, a rapid search algorithm may be adopted. There may be various rapid search methods. For example, only each position within the 1 or 2 reference frames predefined is searched. Or, the search within the frame is simplified, but each frame has to be searched. Or, both the search within a frame and the search among the frames are simplified. For the decoder, if all of the motion information (2 reference frame indexes and 2 motion vectors) are transmitted in the bit-stream, the decoder needs to obtain the motion information from the bit-stream directly.

DETAILED DESCRIPTION OF THE INVENTION

Technical Problem

This disclosure provides an efficient encoding/decoding method, utilizing the correlation within motion information of an image block and correlation between the motion information of the current image block and that of an adjacent image block.

Advantageous Effects of the Invention

In various exemplary embodiments, video encoding method includes encoding, selectively, motion information of a current block including two forward reference frame indexes and two motion vectors into a bit-stream based on a current encoding mode.

In various exemplary embodiments, by selectively encoding the motion information of a current block including two forward reference frame indexes and two motion vectors into a bit-stream based on a current encoding mode, the encoding/decoding method provides the efficiency.

BEST MODE

One aspect of the present disclosure provides a forward multiple-hypothesis encoding method, including:
(1) for an image block A, obtaining a reference image block B and a reference image block C by performing a motion searching in a reference queue, and obtaining a prediction image block P of the image block A using a weighted sum of the reference image blocks B and C;
(2) obtaining a reference frame Fb where the reference image block B is located and a motion vector MVb based on a position of the reference image block B, obtaining a reference frame Fc where the reference image block C is located and a motion vector MVc based on a position of the reference image block C, obtaining a reference frame index RFb based on a position of the reference frame Fb in the reference queue, and obtaining a reference frame index RFc based on a position of the reference frame Fc in the reference queue;
(3) writing information of an encoding mode selected by an encoder into a bit-stream; and
(4) encoding some of RFb, RFc, MVb and MVc into the bit-stream based on the selected encoding mode.

Further, the encoding mode is one of a mode 1, a mode 2, a mode 3 and a mode 4,
(1) when the encoding mode is the mode 1, RFb, MVb and MVc are encoded into the bit-stream, RFc is not encoded into the bit-stream,
(2) when the encoding mode is the mode 2, MVb and MVc are encoded into the bit-stream, RFb and RFc are not encoded into the bit-stream,
(3) when the encoding mode is the mode 3, RFb, RFc and MVb are encoded into the bit-stream, MVc is not encoded into the bit-stream, and
(4) when the encoding mode is the mode 4, RFb and MVb are encoded into the bit-stream, RFc and MVc are not encoded into the bit-stream.

Further, when the encoding mode is the mode 1, MVb={MVb_x,MVb_y} and MVc={MVc_x,MVc_y} meet |MVb_x−MVc_x|>hx and |MVb_y−MVc_y|>hy, hx and by are values defined by the encoder or a video coding standard, and RFb and RFc meet RFb=RFc.

Further, when the encoding mode is the mode 3, RFb and RFc are different from each other.

A second aspect of the present disclosure provides an image block forward multiple-hypothesis decoding method, including:
(1) decoding mode information from a bit-stream;
(2) decoding, based on the mode information, some of RFb, RFc, MVb and MVc from a bit-stream,
wherein RFb is an index of a reference frame Fb where an reference image block B is located in a reference queue, RFc is an index of a reference frame Fc where an reference image block C is located in the reference queue, MVb is a motion vector of a image block A related to the reference image block B, and MVc is a motion vector of the image block A related to the reference image block C;
(3) deriving the other among RFb, RFc, MVb and MVc which are not decoded from the bit-stream by using any one of (a), (b) and (c); and (a) based on motion information of one or more adjacent blocks of the image block A, deriving the other among RFb, RFc, MVb and MVc which are not decoded from the bit-stream;

(b) based on some of RFb, RFc, MVb and MVc decoded from the bit-stream, deriving the other among RFb, RFc, MVb and MVc which are not decoded from the bit-stream; and (c) determining the other among RFb, RFc, MVb and MVc which are not decoded from the bit-stream as a predetermined value; and (4) based on the reference frame indexes RFb, RFc and the motion vectors MVb, MVc, retrieving the reference image block B from the reference frame Fb, retrieving the reference image block C from the reference frame Fc, and obtaining a prediction image block P of the image block A using the retrieved reference image blocks B and C.

Further, the mode information indicates one of a mode 1, a mode 2, a mode 3 and a mode 4, (1) when the mode information indicates the mode 1, the RFb, MVb, and MVb are obtained from the bit-stream, and the RFc is derived based on one of (1-a), (1-b), (1-c), (1-a) RFc=RFb, (1-b) a reference frame index corresponding to a frame which is located in the reference queue and before a current frame where the image block A is located in a displaying order and most close to the current frame is assigned to RFc, and (1-c) a reference frame index of an adjacent block of the image block A is assigned to RFc, (2) when the mode information indicates the mode 2, MVb and MVc are obtained from the bit-stream, and RFb and RFc are derived based on one of (2-a) and (2-b), (2-a) two frames which are in the reference queue and before the current frame where the image block A is located and most close to the current frame in a displaying order are assigned to RFb and RFc respectively, and (2-b) RFb and RFc are derived based on one or more temporally adjacent blocks and/or one or more spatially adjacent blocks, (3) when the mode information indicates the mode 3, RFb, RFc and MVb are decoded from the bit-stream, and MVc is derived based on an existing motion vector derivation method, and (4) when the mode information indicates the mode 4, RFb and MVb are decoded from the bit-stream, and RFc is derived based on one of (4-1) and (4-2), (4-1) a reference frame index, corresponding to a reference frame which is located in the reference queue and most close to the current frame where the image block A is located among all reference frames and which is before the current frame in the displaying order in the reference queue and whose reference frame index is not equal to RFb, is assigned to RFc, and (4-2) a reference frame index of an temporally or spatially adjacent block of the image block A is assigned to RFc.

Further, when the mode information indicates the mode 1, MVb={MVb_x,MVb_y} and MVc={MVc_x,MVc_y} meet |MVb_x−MVc_x|>hx and |MVb_y−MVc_y|>hy, hx and by are values defined by an encoder or an video coding standard, and RFb and RFc meet RFb=RFc.

Further, when the mode information indicates the mode 3, RFb and RFc are different from each other.

A third aspect of the present disclosure provides a forward multiple-hypothesis encoding apparatus, including: a motion searcher, an inter-frame predictor, a motion information selector, a motion information encoder and a mode encoder.

An input of the motion searcher comprises a current image block A and a reference queue, an output of the motion searcher comprises a reference image block B, a reference image block C and a corresponding motion information set {RFb, RFc, MVb, MVc}, all frames in the reference queue are before a current frame where the current image block A is located in a displaying order, RFb denotes an index of a reference frame Fb where the reference image block B is located, RFc denotes an index of a reference frame Fc where the reference image block C is located, MVb denotes a motion vector from the image block A to the reference image block B, MVc denotes a motion vector from the image block A to reference image block C, the motion searcher finds the reference image blocks of the current image block A and outputs the motion information set, An input of the inter-frame predictor comprises the reference image blocks B and C, an output of the inter-frame predictor comprises a prediction image block P, the inter-frame predictor obtains the prediction image block P by taking a weighted sum of the reference image blocks B and C, an input of the motion information selector comprises an encoding mode of the current image block A and the motion information set outputted by the motion searcher, an output of the motion information selector comprises a motion information subset R, the motion information selector obtains the motion information subset R, an input of the motion information encoder comprises the motion information subset R, an output of the motion information encoder comprises a bit-stream, the motion information encoder encodes the motion information subset R into the bit-stream, and an input of the mode encoder comprises the encoding mode and an output of the mode encoder comprises a bit-stream, the mode encoder encodes the encoding mode into the bit-stream.

Further, the encoding mode is one of a mode 1, a mode 2, a mode 3, and a mode 4, the motion information set is {RFb, RFc, MVb, MVc}. And when the encoding mode is the mode 1, the motion information subset R is {RFb, MVb, MVc}, when the encoding mode is the mode 2, the motion information subset R is {MVb, MVc}, when the encoding mode is the mode 3, the motion information subset R is {RFb, RFc, MVb}, when the encoding mode is the mode 4, the motion information subset R is {RFb, MVb}.

Further, when the encoding mode is the mode 1, MVb={MVb_x,MVb_y} and MVc={MVc_x,MVc_y} meet |MVb_x−MVc_x|>hx and |MVb_y−MVc_y|>hy, hx and by are values defined by an encoder or an video coding standard, and RFb and RFc meet RFb=RFc.

Further, when the encoding mode is the mode 3, RFb and RFc are different from each other.

A fourth aspect of the present invention provides a forward multiple-hypothesis decoding apparatus of an image block, including: a mode information decoder, a motion information decoder, a motion information derivator, a reference block retriever and an inter-frame predictor.

An input of the mode information decoder comprises a bit-stream and an output of the mode information decoder comprises mode information of a current image block A, the mode information decoder decodes the mode information of the current image block A from the bit-stream, an input of the motion information decoder comprises the bit-stream and the mode information of the current image block A, an output of the motion information decoder comprises a motion information subset R, the motion information decoder obtains the motion information subset R from the bit-stream based on the mode information of the current image block A, an input of the motion information derivator comprises the motion information subset R and the mode information, an output of the motion information derivator comprises a motion information subset Q, the motion information derivator derives the motion information subset Q based on the motion information subset R, and an intersection of R and Q is empty, an input of the reference block retriever comprises a motion information set U and a reference queue, an output of the reference block retriever comprises two reference image blocks B and C, all frames in the reference queue are before a current frame where the image block A is located in a displaying order, the motion information set U is a union set of the subset R and subset Q, the reference block retriever obtains the two reference image blocks B and C based on the motion information set U and the reference queue, and an input of the inter-frame predictor comprises the reference image blocks B and C, an output comprises a prediction image block P, the inter-frame predictor obtains the prediction image block P by taking a weighted sum of the reference image blocks B and C.

Further, the mode information indicates one of a mode 1, a mode 2, a mode 3, and a mode 4.

When the mode information indicates the mode 1, the motion information subset R is {RFb, MVb, MVc}, when the mode information indicates the mode 2, the motion information subset R is {MVb, MVc}, when the mode information indicates the mode 3, the motion information subset R is {RFb, RFc, MVb}, and when the mode information indicates the mode 4, the motion information subset R is {RFb, MVb}.

Further, when the mode information indicates the mode 1, MVb={MVb_x,MVb_y} and MVc={MVc_x,MVc_y} meet |MVb_x−MVc_x|>hx and |MVb_y−MVc_y|>hy, hx and by are values defined by an encoder or an video coding standard, and RFb and RFc meet RFb=RFc.

MODE OF THE INVENTION

The present disclosure will be described in further detail hereinafter with reference to accompanying drawings and embodiments to make the technical solution and merits therein clearer. Obviously, what described are merely some embodiments of the present disclosure and do not form all embodiments. Based on the embodiments of the present disclosure, those with ordinary skill in the art would get many variations without an inventive work, which are also within the protection scope of the present invention.

Embodiment 1

An N×N image block A in a current image is to be encoded. There are M reference frames in a reference queue. These reference frames are before the current frame in a displaying order. N and M are positive integers. N denotes the size of the image block and M denotes the number of reference frames in the reference queue. There may be various encoding modes for an encoder to encode the image block A and one of the various encoding modes adopts the multiple-hypothesis encoding method, referred to as multiple-hypothesis encoding mode. The multiple-hypothesis encoding mode may adopt one of the following four modes: (a) mode 1, only one reference frame index and two motion vectors are transmitted in the bit-stream; (b) mode 2, only two motion vectors are transmitted in the bit-stream; (c) mode 3, two reference frame indexes and only one motion vector are transmitted in the bit-stream; and (d) mode 4, only one reference frame index and its corresponding motion vector are transmitted in the bit-stream. Accordingly, the encoding of the image block A includes the following.

(1) For the image block A, the encoder performs a motion search to the reference queue to obtain two reference image blocks B and C; wherein the frame where the reference image block B is located is Fb and its corresponding reference frame index is RFb. A position difference between the reference image block B and the image block A is denoted by motion vector MVb. The frame where the reference image block C is located is Fc, its corresponding reference frame index is RFc and the corresponding motion vector is MVc.

(2) A weighted sum of the reference image blocks B and C is taken as a prediction image block P of the image block A.

(3) A encoding mode selected by the encoder is encoded into the bit-stream.

(4) Some of the RFb, RFc, MVb and MVc are encoded into the bit-stream based on the encoding mode.

Embodiment 2

A 16×16 image block A in a current image is to be encoded. There are 4 reference frames in a reference queue. These reference frames are before the current frame in a displaying order. There may be various encoding modes for an encoder to encode the image block A and one of the various encoding modes adopts the multiple-hypothesis encoding method, referred to as multiple-hypothesis encoding mode. The multiple-hypothesis encoding mode may adopt one of the four modes described in embodiment 1. The encoding of the image block A includes the following.

(1) For the image block A, the encoder performs a motion search to the 4 reference queue to obtain two 16×16 reference image blocks B and C. The frame where the reference image block B is located is Fb and its corresponding reference frame index is RFb=2. A position difference between the reference image block B and the image block A is denoted by motion vector MVb, wherein MVb={15, −10}. The frame where the reference image block C is located is Fc, its corresponding reference frame index is RFc=0 and the corresponding motion vector is MVc={12, −8}.

(2) A weighted sum of the reference image blocks B and C is taken as a prediction image block P of the image block A. The weighted sum formula is as shown in formula (1), α=0.5, i.e., the two reference image blocks are equally weighted.

(3) The encoding mode 1 is selected by the encoder after a rate distortion optimization procedure and information of the mode 1 is encoded into the bit-stream.

(4) Based on the encoding mode 1, RFb, MVb and MVc are encoded into the bit-stream, whereas RFc is not encoded into the bit-stream.

Embodiment 3

An 8×8 image block A in a current image is to be encoded. There are 6 reference frames in a reference queue. These reference frames are before the current frame in a displaying order. There may be various encoding modes for an encoder to encode the image block A and one of the various encoding modes adopts the multiple-hypothesis encoding method, referred to as multiple-hypothesis encoding mode. The multiple-hypothesis encoding mode may adopt one of the four modes described in embodiment 1. The encoding of the image block A includes the following.

(1) For the image block A, the encoder performs a motion search to the 6 reference frames to obtain two 16×16 reference image blocks B and C. The frame where the reference image block B is located is Fb and its corresponding reference frame index is RFb=0. A position difference between the reference image block B and the image block A is denoted by motion vector MVb, wherein MVb={1, 2}. The frame where the reference image block C is located is Fc, its corresponding reference frame index is RFc=1 and the corresponding motion vector is MVc={4, 7}.

(2) A weighted sum of the reference image blocks B and C is taken as a prediction image block P of the image block A. The weighted sum formula is as shown in formula (1), $\alpha=\frac{1}{3}$.

(3) The encoding mode 2 is selected by the encoder after a rate distortion optimization procedure and information of the mode 2 is encoded into the bit-stream.

(4) Based on the encoding mode 2, MVb and MVc are encoded into the bit-stream, whereas RFb and RFc are not encoded into the bit-stream.

Embodiment 4

A 32×32 image block A in a current image is to be encoded. There are 3 reference frames in a reference queue. These reference frames are before the current frame in a displaying order. There may be various encoding modes for an encoder to encode the image block A and one of the various encoding modes adopts the multiple-hypothesis encoding method, referred to as multiple-hypothesis encoding mode. The multiple-hypothesis encoding mode may adopt one of the four modes described in embodiment 1. The encoding of the image block A includes the following.

(1) For the image block A, the encoder performs a motion search to the reference frames to obtain two 32×32 reference image blocks B and C. The frame where the reference image block B is located is Fb and its corresponding reference frame index is RFb=0. A position difference between the reference image block B and the image block A is denoted by motion vector MVb, wherein MVb={1, 3}. The frame where the reference image block C is located is Fc, its corresponding reference frame index is RFc=2 and corresponding motion vector is MVc={3, 9}.

(2) A weighted sum of the reference image blocks B and C is taken as a prediction image block P of the image block A, wherein the weighted sum formula is as shown in formula (1), a is determined based on distances among the two reference frames and the current frame. The distance between Fb and the current frame is 1, the distance between Fc and the current frame is 3. Therefore, the weight of the reference image block C is 1/(1+3)=0.25, let $\alpha=0.25$.

(3) The encoding mode 3 is selected by the encoder after a rate distortion optimization procedure and information of the mode 3 is encoded into the bit-stream.

(4) Based on the encoding mode 3, RFb, RFc and MVb are encoded into the bit-stream, whereas MVc is not encoded into the bit-stream.

Embodiment 5

A 64×64 image block A in a current image is to be encoded. There are 4 reference frames in a reference queue. These reference frames are before the current frame in a displaying order. There may be various encoding modes for an encoder to encode the image block A and one of the various encoding modes adopts the multiple-hypothesis encoding method, referred to as multiple-hypothesis encoding mode. The multiple-hypothesis encoding mode may adopt one of the four modes described in embodiment 1. The encoding of the image block A includes the following.

(1) For the image block A, the encoder performs a motion search to the reference frames to obtain two 64×64 reference image blocks B and C. The frame where the reference image block B is located is Fb and its corresponding reference frame index is RFb=0. A position difference between the reference image block B and the image block A is denoted by motion vector MVb, wherein MVb, {5, 7}. The frame where the reference image block C is located is Fc, its corresponding reference frame index is RFc=1 and the corresponding motion vector is MVc={10, 14}.

(2) A weighted sum of the reference image blocks B and C is taken as a prediction image block P of the image block A, wherein the weighted sum formula is as shown in formula (1), $\alpha=0.5$, i.e., the two reference image blocks are equally weighted.

(3) The encoding mode 4 is selected by the encoder after a rate distortion optimization procedure and information of the mode 4 is encoded into the bit-stream.

(4) Based on the encoding mode 4, RFb and MVb are encoded into the bit-stream, whereas RFc and MVc are not encoded into the bit-stream.

Embodiment 6

A 32×32 image block A in a current image is to be encoded. There are 10 reference frames in a reference queue. These reference frames are before the current frame in a displaying order. There may be various encoding modes for an encoder to encode the image block A and one of the various encoding modes adopts the multiple-hypothesis encoding method, referred to as multiple-hypothesis encoding mode. The multiple-hypothesis encoding mode may adopt one of the four modes described in embodiment 1. The encoding of the image block A includes the following.

(1) For the image block A, the encoder performs a motion search to the reference frames to obtain two 32×32 reference image blocks B and C. The frame where the reference image block B is located is Fb and its corresponding reference frame index is RFb=0. A position difference between the reference image block B and the image block A is denoted by motion vector MVb, wherein MVb, {3, 4}. The frame where the reference image block C is located is Fc, its corresponding reference frame index is RFc=0 and the corresponding motion vector is MVc={10, 9}.

(2) A weighted sum of the reference image blocks B and C is taken as a prediction image block P of the image block A, wherein the weighted sum formula is as shown in formula (1), $\alpha=0.5$, i.e., the two reference image blocks are equally weighted.

(3) The encoding mode 1 is selected by the encoder after a rate distortion optimization procedure and information of the mode 1 is encoded into the bit-stream.

(4) According to the encoding mode 1, MVb, {MVb_x, MVb_y} and MVc={MVc_x,MVc_y} should meet |MVb_x−MVc_x|=|3−10|=7>hx and |MVb_y−MVc_y|=|4−9|=5>hy, wherein hx and hy are fixed values defined by the encoder or a video coding standard; |*| denotes an absolute value. In this embodiment, it is supposed that hx=2 and hy=2. Meanwhile since RFb=0 and RFc=0, they meet RFb=RFc. RFb, MVb and MVc are encoded into the bit-stream, whereas RFc is not encoded into the bit-stream.

Embodiment 7

A 4×4 image block A in a current image is to be encoded. There are 4 reference frames in a reference queue. These reference frames are before the current frame in a displaying order. There may be various encoding modes for an encoder to encode the image block A and one of the various encoding modes adopts the multiple-hypothesis encoding method, referred to as multiple-hypothesis encoding mode. The multiple-hypothesis encoding mode may adopt one of the four modes described in embodiment 1. The encoding of the image block A includes the following.

(1) For the image block A, the encoder performs a motion search to the reference frames to obtain two 4×4 reference image blocks B and C. The frame where the reference image block B is located is Fb and its corresponding reference frame index is RFb=0. A position difference between the reference image block B and the image block A is denoted by motion vector MVb, wherein MVb={2, 4}. The frame where the reference image block C is located is Fc, its corresponding reference frame index is RFc=1 and the corresponding motion vector is MVc={4, 8}.

(2) A weighted sum of the reference image blocks B and C is taken as a prediction image block P of the image block A, wherein the weighted sum formula is as shown in formula (1), α=0.5, i.e., the two reference image blocks are equally weighted.

(3) The encoding mode 3 is selected by the encoder after a rate distortion optimization procedure and information of the mode 3 is encoded into the bit-stream.

(4) According to the encoding mode 3, RFb and RFc should not be equal to each other. In this embodiment, RFb=0 and RFc=1. RFb, RFc and MVb are encoded into the bit-stream, whereas MVc is not encoded into the bit-stream.

Embodiment 8

An N×N image block A in a current image is to be decoded. There are M reference frames in a reference queue. N and M are positive integers. N denotes the size of the image block and M denotes the number of reference frames in the reference queue. These reference frames are before the current frame in a displaying order. There may be various decoding modes for a decoder to decode the image block A and one of the various decoding modes adopts the multiple-hypothesis decoding method, referred to as multiple-hypothesis decoding mode. The multiple-hypothesis decoding mode may adopt one of the following four modes: (a) mode 1, only one reference frame index and two motion vectors are decoded from the bit-stream. (b) mode 2, only two motion vectors are decoded from the bit-stream. (c) mode 3, two reference frame indexes and only one motion vector are decoded from the bit-stream. (d) mode 4, only one reference frame index and its corresponding motion vector are decoded from the bit-stream. As a result, the decoding of the image block A includes the following.

(1) Mode information of the image block A is decoded from the bit-stream.

(2) Based on the mode information, some of RFb, RFc, MVb and MVc are decoded from the bit-stream, wherein RFb denotes the index of reference frame Fb where the reference image block B is located in the reference queue, RFc denotes the index of reference frame Fc where the reference image block C is located in the reference queue, MVb denotes the motion vector of the image block A relative to the reference image block B, MVc denotes the motion vector of the image block A relative to the reference image block C. The reference image blocks B and C are reference image blocks of the image block A.

(3) The other information among RFb, RFc, MVb and MVc which is not decoded from the bit-stream is derived according to one of the following three methods:
  a) The other information among RFb, RFc, MVb and MVc which is not decoded from the bit-stream is derived based on motion information of one or more adjacent blocks of the image block A.
  b) Based on some of RFb, RFc, MVb and MVc which are decoded, the other information among RFb, RFc, MVb and MVc which is not decoded from the bit-stream is derived; and
  c) The other information among RFb, RFc, MVb and MVc which is not decoded from the bit-stream is predetermined as a fixed value.

(4) Based on the reference frame indexes RFb, RFc and the motion vectors MVb and MVc, the reference image block B is retrieved from the reference frame Fb, the reference image block C is retrieved from the reference frame Fc. In a displaying order, Fb and Fc are both before the image frame Fa where the image block A is located.

(5) A weighted sum of the reference image blocks B and C is taken as a prediction image block P of the image block A.

Embodiment 9

A 16×16 image block A in a current image is to be decoded. There are 4 reference frames in a reference queue. These reference frames are before the current frame in a displaying order. There may be various decoding modes for a decoder to decode the image block A and one of the various decoding modes adopts the multiple-hypothesis decoding method, referred to as multiple-hypothesis decoding mode. The multiple-hypothesis decoding mode may adopt any one of the four modes described in embodiment 8. The decoding of the image block A includes the following.

(1) Mode information of the image block A is decoded from the bit-stream. The decoded result is that the decoding mode of the image block A is the mode 1.

(2) Based on the mode 1, RFb, MVb and MVc are decoded from the bit-stream, wherein RFb denotes an index of reference frame Fb where the reference image block B is located in the reference queue, RFc denotes an index of reference frame Fc where the reference image block C is located in the reference queue, MVb denotes the motion vector of the image block A relative to the reference image block B, MVc denotes the motion vector of the image block A relative to the reference image block C. In this embodiment RFb=1, MVb={4, 9}, MVc={2, 3}, and the reference image blocks B and C are reference image blocks of the image block A.

(3) The index RFc of reference frame Fc where the reference image block C is located in the reference queue is derived. The deriving rule is as follows: a frame most close to the current frame in the reference queue is found and the index of this most close reference frame in the reference queue is denoted by idx, and then RFc is set to idx. In this embodiment, it is supposed idx=0. Thus, it is obtained that RFc=0.

(4) Based on the reference frame indexes RFb, RFc and the motion vectors MVb and MVc, the reference image block B is retrieved from the reference frame Fb, the reference image block C is retrieved from the reference frame Fc. In a displaying order, Fb and Fc are both before the image frame Fa where the image block A is located.

(5) A weighted sum of the reference image blocks B and C is taken as a prediction image block P of the image block A. The weighted sum is calculated according to formula (1), wherein α=0.5, i.e., the two reference image blocks are equally weighted.

Embodiment 10

A 32×32 image block A in a current image is to be decoded. There are 7 reference frames in a reference queue. These reference frames are before the current frame in a displaying order. There may be various decoding modes for a decoder to decode the image block A and one of the various decoding modes adopts the multiple-hypothesis decoding method, referred to as multiple-hypothesis decoding mode. The multiple-hypothesis decoding mode may adopt any one of the four modes described in embodiment 8. The decoding of the image block A includes the following.

(1) Mode information of the image block A is decoded from the bit-stream. The decoded result is that the decoding mode of the image block A is the mode 1.

(2) Based on the mode 1, RFb, MVb and MVc are decoded from the bit-stream. wherein RFb denotes an index of reference frame Fb where the reference image block B is located in the reference queue, RFc denotes an index of reference frame Fc where the reference image block C is located in the reference queue, MVb denotes the motion vector of the image block A relative to the reference image block B, MVc denotes the motion vector of the image block A relative to the reference image block C. In this embodiment RFb=2, MVb={2, 7}, MVc={10, 3}, and the reference image blocks B and C are reference image blocks of the image block A.

(3) The index RFc of reference frame Fc where the reference image block C is located in the reference queue is derived according to RFb. A derivation rule is as follows: RFc=RFb. Thus, it is obtained that RFc=2.

(4) Based on the reference frame indexes RFb, RFc and the motion vectors MVb and MVc, the reference image block B is retrieved from the reference frame Fb, the reference image block C is retrieved from the reference frame Fc. In a displaying order, Fb and Fc are both before the image frame Fa where the image block A is located.

(5) A weighted sum of the reference image blocks B and C is taken as a prediction image block P of the image block A. The weighted sum is calculated according to formula (1), wherein α=0.5, i.e., the two reference image blocks are equally weighted.

Embodiment 11

A 64×64 image block A in a current image is to be decoded. There are 4 reference frames in a reference queue.
These reference frames are before the current frame in a displaying order. There may be various decoding modes for a decoder to decode the image block A and one of the various decoding modes adopts the multiple-hypothesis decoding method, referred to as multiple-hypothesis decoding mode. The multiple-hypothesis decoding mode may adopt any one of the four modes described in embodiment 8. The decoding of the image block A includes the following.

(1) Mode information of the image block A is decoded from the bit-stream. The decoded result is that the decoding mode of the image block A is the mode 1.

(2) Based on the mode 1, RFb, MVb and MVc are decoded from the bit-stream, wherein RFb denotes an index of reference frame Fb where the reference image block B is located in the reference queue, RFc denotes an index of reference frame Fc where the reference image block C is located in the reference queue, MVb denotes the motion vector of the image block A relative to the reference image block B, MVc denotes the motion vector to of the image block A relative to the reference image block C. In this embodiment RFb=2, MVb={2, 7}, MVc={10, 3}, The reference image blocks B and C are reference image blocks of the image block A.

(3) The index RFc of reference frame Fc where the reference image block C is located in the reference queue is derived. A derivation rule is as follows: a left adjacent image block L of the image block A is obtained. If block L has two reference frame indexes, a smaller one is obtained and is denoted by idx. If block L has only one reference frame index, this reference frame index is denoted by idx. If block L has no reference frame index, i.e., no inter-frame prediction coding is performed on L, idx is set to 0. In this embodiment, it is supposed the block L is a uni-hypothesis coded block which has only one reference index idx=1. Therefore, the derived result is RFc=1.

(4) Based on the reference frame indexes RFb, RFc and the motion vectors MVb, MVc, the reference image block B is retrieved from the reference frame Fb, the reference image block C is retrieved from the reference frame Fc. In a displaying order, Fb and Fc are both before the image frame Fa where the image block A is located.

(5) A weighted sum of the reference image blocks B and C is taken as a prediction image block P of the image block A. The weighted sum is calculated according to formula (1), a is determined based on distances among the two reference frames and the current frame. The distance between Fb and the current frame is 3. The distance between Fc and the current frame is 2. Therefore, the weight of the reference image block C is 3/(2+3)=0.6. Thus, α=0.6.

The left image block in step (3) of embodiment 11, may be replaced by any temporally adjacent block or spatially adjacent block as shown in FIGS. 1A and 1B. The left image block is merely an example in this embodiment.

Embodiment 12

An 8×8 image block A in a current image is to be decoded. There are 6 reference frames in a reference queue. These reference frames are before the current frame in a displaying order. There may be various decoding modes for a decoder to decode the image block A and one of the various decoding modes adopts the multiple-hypothesis decoding method, referred to as multiple-hypothesis decoding mode. The multiple-hypothesis decoding mode may adopt any one of the four modes described in embodiment 8. The decoding of the image block A includes the following.

(1) Mode information of the image block A is decoded from the bit-stream. The decoded result is that the decoding mode of the image block A is the mode 2.

(2) Based on the mode 2, MVb and MVc are decoded from the bit-stream, wherein MVb denotes the motion vector of the image block A relative to the reference image block B, MVc denotes the motion vector of the image block A relative to the reference image block C. In this embodiment MVb={3, 8}, MVc={9, 2}. The reference image blocks B and C are reference image blocks of the image block A.

(3) RFb denotes an index of reference frame Fb where the reference image block B is located in the reference queue and RFc denotes an index of reference frame Fc where the reference image block C is located in the reference queue, RFb and RFc may be derived. And a derivation rule is as follows: two reference frames in the reference queue which are most close to the current frame are found and the indexes of these two most close reference frames in the reference queue are denoted by idx1 and idx2 respectively. Then RFb is set to idx1 and RFc is set to idx2. In this embodiment, it is supposed that idx1=0 and idx2=1. Thus, it is obtained that RFb=0 and RFc=1.

(4) Based on the reference frame indexes RFb, RFc and the motion vectors MVb and MVc, the reference image block B is retrieved from the reference frame Fb, the reference image block C is retrieved from the reference frame Fc. In a displaying order, Fb and Fc are both before the image frame Fa where the image block A is located.

(5) A weighted sum of the reference image blocks B and C is taken as a prediction image block P of the image block A. The weighted sum is calculated according to formula (1), wherein $\alpha$=0.5, i.e., the two reference image blocks are equally weighted.

Embodiment 13

A 4×4 image block A in a current image is to be decoded. There are 5 reference frames in a reference queue. These reference frames are before the current frame in a displaying order. There may be various decoding modes for a decoder to decode the image block A and one of the various decoding modes adopts the multiple-hypothesis decoding method, referred to as multiple-hypothesis decoding mode. The multiple-hypothesis decoding mode may adopt any one of the four modes described in embodiment 8. The decoding of the image block A includes the following.

(1) Mode information of the image block A is decoded from the bit-stream. The decoded result is that the decoding mode of the image block A is the mode 2.

(2) Based on the mode 2, MVb and MVc are decoded from the bit-stream, wherein MVb denotes the motion vector of the image block A relative to the reference image block B, MVc denotes the motion vector of the image block A relative to the reference image block C, in this embodiment MVb={3, −8}, MVc={−9, 2}. The reference image blocks B and C are reference image blocks of the image block A.

(3) RFb denotes the index of reference frame Fb where the reference image block B is located in the reference queue and RFc denotes the index of reference frame Fc where the reference image block C is located in the reference queue, Fb and Fc may be derived. A derivation rule is as follows: RFb is set to idx1 and RFc is set to idx2, wherein idx1 and idx2 are derived based on the reference frame indexes of a top adjacent block. In particular, if the top adjacent block has two reference frame indexes, the two reference frame indexes are denoted by idx1 and idx2, respectively. If the top adjacent block has only one reference frame index, this reference frame index is denoted by idx1 and idx2 is set to 0. If the top adjacent block is a non-inter-frame encoded block and has no reference frame index, idx1 is set to 0 and idx2 is set to 1. In this embodiment, it is supposed that the top adjacent block is a multiple-hypothesis encoded block and has two reference frame indexes idx1=1 and idx2=2. Thus, it is obtained that RFb=1 and RFc=2.

(4) Based on the reference frame indexes RFb, RFc and the motion vectors MVb and MVc, the reference image block B is retrieved from the reference frame Fb, the reference image block C is retrieved from the reference frame Fc. In a displaying order, Fb and Fc are both before the image frame Fa where the image block A is located.

(5) A weighted sum of the reference image blocks B and C is taken as a prediction image block P of the image block A. The weighted sum is calculated according to formula (1), wherein $\alpha$=0.5, i.e., the two reference image blocks are equally weighted.

The top adjacent image block in step (3) of embodiment 13 may be replaced by any temporally adjacent block or any spatially adjacent block as shown in FIGS. 1A and 1B. The top adjacent block is merely an example in this embodiment.

Embodiment 14

A 16×16 image block A in a current image is to be decoded. There are 8 reference frames in a reference queue. These reference frames are before the current frame in a displaying order. There may be various decoding modes for a decoder to decode the image block A and one of the various decoding modes adopts the multiple-hypothesis decoding method, referred to as multiple-hypothesis decoding mode. The multiple-hypothesis decoding mode may adopt any one of the four modes described in embodiment 8. The decoding of the image block A includes the following.

(1) Mode information of the image block A is decoded from the bit-stream. The decoded result is that the decoding mode of the image block A is the mode 3.

(2) Based on the mode 3, RFb, RFc and MVb are decoded from the bit-stream, wherein RFb denotes an index of reference frame Fb where the reference image block B is located in the reference queue, RFc denotes an index of reference frame Fc where the reference image block C is located in the reference queue, MVb denotes the motion vector of the image block A relative to the reference image block B, In this embodiment RFb=1, RFc=5, MVb={−1, −1}. The reference image blocks B and C are reference image blocks of the image block A.

(3) A motion vector MVc denotes the motion vector of the image block A relative to the reference image block C. MVc is derived based on RFb, RFc and MVb based on a scaling MV derivation method. The distance between Fb and the current frame is 2. The distance between Fc and the current frame is 6. Thus, MVc={−1×6/2, −1×6/2}={−3,−3}.

(4) According to the reference frame indexes RFb, RFc and the motion vectors MVb and MVc, the reference image block B is retrieved from the reference frame Fb, the reference image block C is retrieved from the reference frame Fc. In a displaying order, Fb and Fc are both before the image frame Fa where the image block A is located.

(5) A weighted sum of the reference image blocks B and C is taken as a prediction image block P of the image block A. The weighted sum is calculated according to formula (1), wherein α=0.5, i.e., the two reference image blocks are equally weighted.

Embodiment 15

A 16×16 image block A in a current image is to be decoded. There are 4 reference frames in a reference queue. These reference frames are before the current frame in a displaying order. There may be various decoding modes for a decoder to decode the image block A and one of the various decoding modes adopts the multiple-hypothesis decoding method, referred to as multiple-hypothesis decoding mode. The multiple-hypothesis decoding mode may adopt any one of the four modes described in embodiment 8. The decoding of the image block A includes the following.

(1) Mode information of the image block A is decoded from the bit-stream. The decoded result is that the decoding mode of the image block A is the mode 4.

(2) Based on the mode 4, RFb and MVb are decoded from the bit-stream, wherein RFb denotes an index of reference frame Fb where the reference image block B is located in the reference queue, MVb denotes the motion vector of the image block A relative to the reference image block B. In this embodiment RFb=1, MVb={8, 6}. The reference image blocks B and C are reference image blocks of the image block A.

(3) RFc denotes an index of reference frame Fc where the reference image block C is located in the reference queue. RFc is derived based on RFb. A derivation rule is as follows: a reference frame with a different index from RFb in the reference queue which is most close to the current frame is found and the index of this reference frame in the reference queue is denoted by idx, and then RFc is set to idx. In this embodiment, it is supposed that idx=0. Thus, it is obtained that RFc=0.

(4) A motion vector MVc denotes the motion vector of the image block A relative to the reference image block C. MVc is derived based on RFb, RFc and MVb based on a scaling MV derivation method. The distance between Fb and the current frame is 2. The distance between Fc and the current frame is 1. Thus, MVc={8×½, 6×½}={4,3}.

(5) Based on the reference frame indexes RFb, RFc and the motion vectors MVb, MVc, the reference image block B is retrieved from the reference frame Fb, the reference image block C is retrieved from the reference frame Fc. In a displaying order, Fb and Fc are both before the image frame Fa where the image block A is located.

(6) A weighted sum of the reference image blocks B and C is taken as a prediction image block P of the image block A. The weighted sum is calculated according to formula (1), wherein α=0.5, i.e., the two reference image blocks are equally weighted.

Embodiment 16

A 128×128 image block A in a current image is to be decoded. There are 4 reference frames in a reference queue. These reference frames are before the current frame in a displaying order. There may be various decoding modes for a decoder to decode the image block A and one of the various decoding modes adopts the multiple-hypothesis decoding method, referred to as multiple-hypothesis decoding mode. The multiple-hypothesis decoding mode may adopt any one of the four modes described in embodiment 8. The decoding of the image block A includes the following.

(1) Mode information of the image block A is decoded from the bit-stream. The decoded result is that the decoding mode of the image block A is the mode 4.

(2) Based on the mode 4, RFb and MVb are decoded from the bit-stream, wherein RFb denotes an index of reference frame Fb where the reference image block B is located in the reference queue, MVb denotes the motion vector of the image block A relative to the reference image block B. In this embodiment RFb=1, MVb={2, 9}. The reference image blocks B and C are reference image blocks of the image block A.

(3) RFc denotes an index of reference frame Fc where the reference image block C is located in the reference queue and a motion vector MVc denotes the motion vector of the image block A relative to the reference image block C. And RFc and MVc may be derived. A derivation rule is as follows: a left-bottom adjacent image block LB of the image block A is obtained. If the block LB has two reference frame indexes, the smaller one is obtained and denoted by idx. If the block LB has only one reference frame index, this index is denoted by idx. A motion vector of the block LB corresponding to the reference frame with index being idx is denoted by my. And then RFc is set to idx and MVc is set to my. If the block LB has no reference frame index, i.e., no inter-frame prediction coding is performed on the block LB, a frame which is most close to the current frame and has an index different from RFb is retrieved from the reference queue. The index of the retrieved frame in the reference queue is denoted by idx, and then RFc is set to idx. In this case, MVc may be derived based on RFb, RFc and MVb based on a scaling MV derivation method. In this embodiment, it is supposed that the block LB has only one reference frame index idx=2, its corresponding motion vector my is {7, 2}. Thus, it is obtained that RFc=2, MVc={7, 2}.

(4) According to the reference frame indexes RFb, RFc and the motion vectors MVb, MVc, the reference image block B is retrieved from the reference frame Fb, the reference image block C is retrieved from the reference frame Fc. In a displaying order, Fb and Fc are both before the image frame Fa where the image block A is located.

(5) A weighted sum of the reference image blocks B and C is taken as a prediction image block P of the image block A. The weighted sum is calculated according to formula (1), wherein α=0.5, i.e., the two reference image blocks are equally weighted.

The left-bottom adjacent image block in step (3) of embodiment 16 may be replaced by any temporally adjacent block or any spatially adjacent block as shown in FIGS. 1A and 1B. The left-bottom adjacent block is merely an example in this embodiment.

Embodiment 17

A 16×16 image block A in a current image is to be decoded. There are 4 reference frames in a reference queue. These reference frames are before the current frame in a displaying order. There may be various decoding modes for a decoder to decode the image block A and one of the various decoding modes adopts the multiple-hypothesis decoding method, referred to as multiple-hypothesis decoding mode. The multiple-hypothesis decoding mode may adopt any one of the four modes described in embodiment 8. The decoding of the image block A includes the following.

(1) Mode information of the image block A is decoded from the bit-stream. The decoded result is that the decoding mode of the image block A is the mode 3.

(2) Based on the mode 3, RFb, RFc and MVb are decoded from the bit-stream, wherein RFb denotes an index of reference frame Fb where the reference image block B is located in the reference queue, RFc denotes an index of reference frame Fc where the reference image block C is located in the reference queue, MVb denotes the motion vector of the image block A relative to the reference image block B. In this embodiment RFc=3, MVb={−20, 15}. The reference image blocks B and C are reference image blocks of the image block A.

(3) The motion vector MVc of the reference image block C relative to the image block A is derived based on RFb, RFc and MVb based on a scaling MV derivation method. The distance between Fb and the current frame is 5. The distance between Fc and the current frame is 8. Thus, MVc={−20×8/5, 15×8/5}={−32,24}.

(4) Based on the reference frame indexes RFb, RFc and the motion vectors MVb and MVc, the reference image block B is retrieved from the reference frame Fb, the reference image block C is retrieved from the reference frame Fc. In a displaying order, Fb and Fc are both before the image frame Fa where the image block A is located.

(5) A weighted sum of the reference image blocks B and C is taken as a prediction image block P of the image block A. The weighted sum is calculated according to formula (1), wherein α=0.5, i.e., the two reference image blocks are equally weighted.

Embodiment 18

A 16×16 image block A in a current image is to be decoded. There are 4 reference frames in a reference queue. These reference frames are before the current frame in a displaying order. There may be various decoding modes for a decoder to decode the image block A and one of the various decoding modes adopts the multiple-hypothesis decoding method, referred to as multiple-hypothesis decoding mode. The multiple-hypothesis decoding mode may adopt any one of the four modes described in embodiment 8. The decoding of the image block A includes the following.

(1) Mode information of the image block A is decoded from the bit-stream. The decoded result is that the decoding mode of the image block A is the mode 1.

(2) Based on mode 1, RFb, MVb and MVc are decoded from the bit-stream, wherein RFb=1, MVb={−20, 9}, MVc={10, 2}. In this mode, MVb={MVb_x,MVb_y} and MVc={MVc_x,MVc_y} meet |MVb_x−MVc_x|>hx and |MVb_y−MVc_y|>hy, hx and hy are fixed values defined by an encoder or a video coding standard, |*| denotes an absolute value, in this embodiment, it is supposed that hx=2, hy=2, RFb denotes the index of reference frame Fb where the reference image block B is located in the reference queue, MVb denotes the motion vector of the image block A relative to the reference image block B, MVc denotes the motion vector of the image block A relative to the reference image block C. The reference image blocks B and C are reference image blocks of the image block A.

(3) The index RFc of reference frame Fc where the reference image block C is located in the reference queue is derived according to a derivation rule of RFc=RFb. Therefore, it is obtained that RFc=1.

(4) Based on the reference frame indexes RFb, RFc and the motion vectors MVb and MVc, the reference image block B is retrieved from the reference frame Fb, the reference image block C is retrieved from the reference frame Fc. In a displaying order, Fb and Fc are both before the image frame Fa where the image block A is located.

(5) A weighted sum of the reference image blocks B and C is taken as a prediction image block P of the image block A. The weighted sum is calculated according to formula (1), wherein α=0.5, i.e., the two reference image blocks are equally weighted.

Embodiment 19

Figure 2:
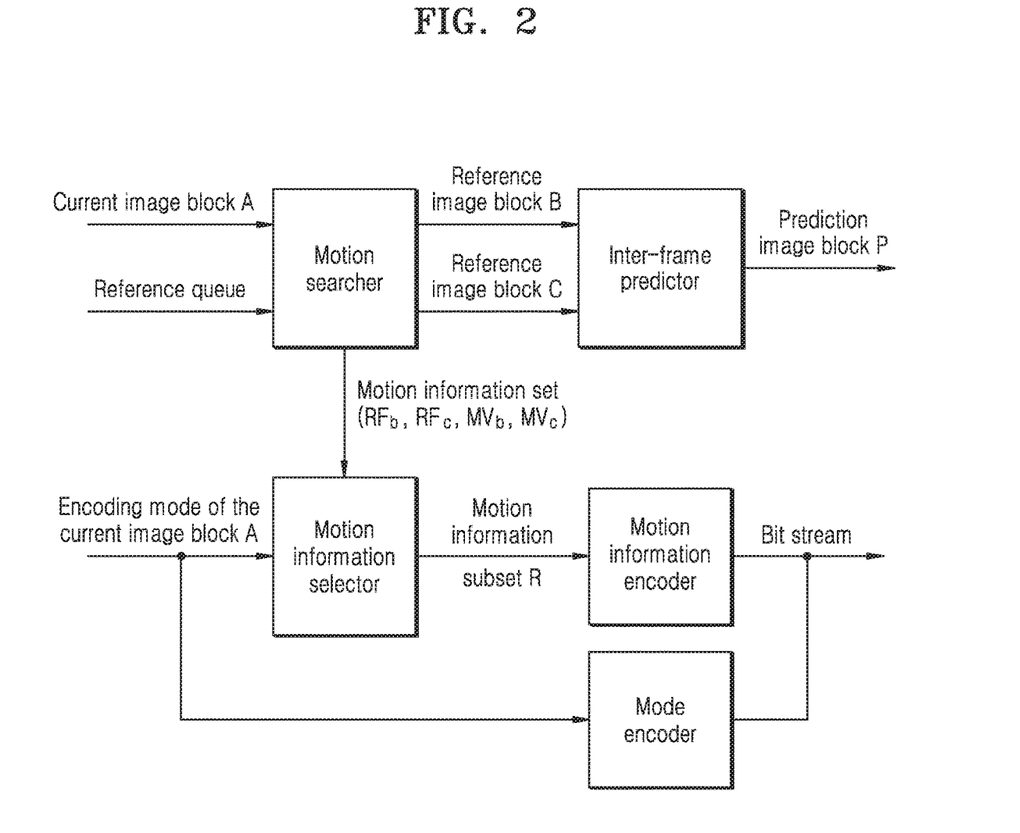
FIG. 2 is a schematic diagram illustrating a structure of a forward multiple-hypothesis encoding apparatus according to an embodiment of the present disclosure.

A forward multiple-hypothesis encoding apparatus is as shown in FIG. 2. The apparatus includes: a motion searcher, an inter-frame predictor, a motion information selector, a motion information encoder and a mode encoder. Relationships and functions of the above components are as follows.

The input of the motion searcher includes a current image block A and a reference queue. The output includes a reference image block B, a reference image block C and a corresponding motion information set U={RFb, RFc, MVb, MVc}. All frames in the reference queue are before the current frame in a displaying order. RFb denotes the index of reference frame Fb where the reference image block B is located in the reference queue. RFc denotes the index of reference frame Fc where the reference image block C is located in the reference queue. MVb denotes the motion vector of the image block A relative to the reference image block B. MVc denotes the motion vector of the image block A relative to the reference image block C. The motion searcher is to find two reference image blocks of the current image block A in the reference queue and to output the motion information.

The input of the inter-frame predictor includes the reference image blocks B and C. The output includes a prediction image block P. The inter-frame predictor is to take a weighted sum of the reference image blocks B and C to obtain the prediction image block P.

The input of the motion information selector includes the encoding mode of the current image block A and the motion information set U outputted by the motion searcher. The output includes a motion information subset R. The motion information selector is to select a motion information subset.

The input of the motion information encoder includes the motion information subset R, and the output includes a bit-stream. The motion information encoder is to encode the motion information subset into a bit-stream.

The input of the mode encoder includes the encoding mode and the output includes a bit-stream. The mode encoder is to encode the encoding mode into a bit-stream.

Embodiment 20

A forward multiple-hypothesis encoding apparatus includes: a motion searcher, an inter-frame predictor, a motion information selector, a motion information encoder and a mode encoder. The relationships and functions of the components are as described with reference to embodiment 19. The encoding mode inputted to the motion information selector has four types, independently are modes 1, 2, 3 and 4. The motion information set is {RFb, RFc, MVb, MVc}. When the encoding mode is the mode 1, the motion information outputted by the motion information selector is {RFb, MVb, MVc}, when the encoding mode is the mode 2, the motion information outputted by the motion information selector is {MVb, MVc}, when the encoding mode is the mode 3, the motion information outputted by the motion information selector is {RFb, RFc, MVb}, and when the encoding mode is the mode 4, the motion information outputted by the motion information selector is {RFb, MVb}.

Embodiment 21

A forward multiple-hypothesis encoding apparatus includes: a motion searcher, an inter-frame predictor, a motion information selector, a motion information encoder and a mode encoder. The relationships and functions of the components are as described with reference to embodiment 20. If the encoding mode inputted to the motion information selector is the mode 1, MVb={MVb_x,MVb_y} and MVc={MVc_x,MVc_y} meet |MVb_x−MVc_x|>hx and |MVb_y−MVc_y|>hy, wherein hx and hy are values defined by an encoder or a video coding standard. RFb and RFc meet RFb=RFc.

Embodiment 22

A forward multiple-hypothesis encoding apparatus includes: a motion searcher, an inter-frame predictor, a motion information selector, a motion information encoder and a mode encoder. The relationships and functions of the components are as described with reference to embodiment 20. If the encoding mode inputted to the motion information selector is mode 3, RFb and RFc are not equal to each other.

Embodiment 23

Figure 3:
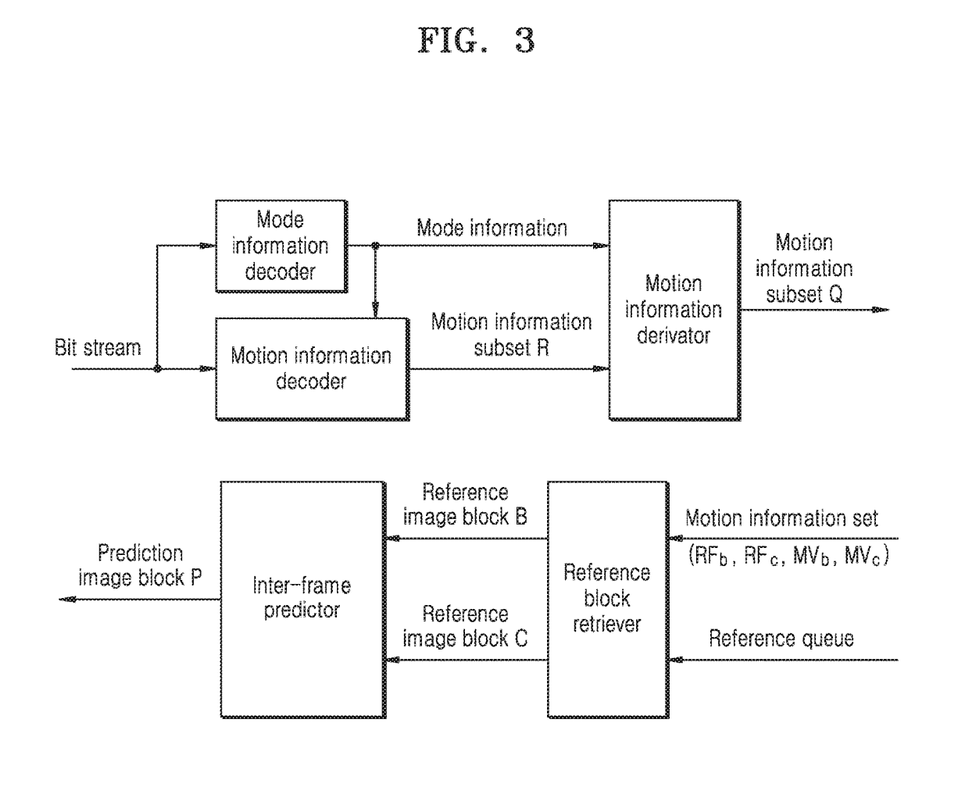
FIG. 3 is a schematic diagram illustrating a structure of a forward multiple-hypothesis decoding apparatus according to an embodiment of the present disclosure.

A forward multiple-hypothesis decoding apparatus is as shown in FIG. 3. The apparatus includes: a mode information decoder, a motion information decoder, a motion information derivator, a reference block retriever and an inter-frame predictor. The relationships and functions of the components are as follows.

The input of the mode information decoder includes a bit-stream and the output of the mode information decoder includes mode information of the current image block A. The mode information decoder is to decode the mode information of the image block A from the bit-stream.

The input of the motion information decoder includes the bit-stream and the mode information of the image block A. The output of the motion information decoder includes a motion information subset R. The motion information decoder is to obtain some of motion information of the image block A based on the bit-stream and the mode information.

The input of the motion information derivator includes the motion information subset R and the mode information, the output of the motion information derivator includes a motion information subset Q, wherein an intersection of R and Q is empty. Based on some of the motion information which is decoded, the motion information derivator is to derive the other among the motion information.

The input of the reference block retriever includes a motion information set U and a reference queue, the output of the reference block retriever includes two reference image blocks B and C, wherein all frames in the reference queue are before the current frame in a displaying order, the motion information set U is a union set of the subset R and subset Q. This reference block retriever is to obtain two forward reference image blocks based on the derived motion information and the reference queue.

The input of the inter-frame predictor includes the reference image blocks B and C, and the output includes a prediction image block P. The inter-frame predictor is to take a weighted sum of the reference image blocks B and C to obtain the prediction image block P.

Embodiment 24

A forward multiple-hypothesis decoding apparatus is as shown in FIG. 3. The apparatus includes: a mode information decoder, a motion information decoder, a motion information derivator, a reference block retriever and an inter-frame predictor. The relationships and functions of the components are as described with reference to embodiment 23.

The mode information inputted to the motion information decoder has four types, independently are modes 1, 2, 3 and 4.

When the mode information indicates the mode 1, the motion information subset R is {RFb, MVb, MVc}, When the mode information indicates the mode 2, the motion information subset R is {MVb, MVc}, When the mode information indicates the mode 3, the motion information subset R is {RFb, RFc, MVb}, and When the mode information indicates the mode 4, the motion information subset R is {RFb, MVb}.

Embodiment 25

A forward multiple-hypothesis decoding apparatus is as shown in FIG. 3. The apparatus includes: a mode information decoder, a motion information decoder, a motion information derivator, a reference block retriever and an inter-frame predictor. The relationships and functions of the components are as described with reference to embodiment 24, when the mode information inputted to the motion information decoder indicates mode 1, MVb={MVb_x, MVb_y} and MVc={MVc_x,MVc_y} meet |MVb_x−MVc_x|>hx and |MVb_y|−MVc_y|>hy, wherein hx and hy are values defined by an encoder or a video coding standard. And RFb and RFc meet RFb=RFc.

Embodiment 26

A forward multiple-hypothesis decoding is as shown in FIG. 3. The apparatus includes: a mode information decoder, a motion information decoder, a motion information derivator, a reference block retriever and an inter-frame predictor. The relationships and functions of the components are as described with reference to embodiment 24. When the mode information inputted to the motion information decoder indicates mode 3, RFb and RFc are not equal to each other.

The foregoing descriptions are only preferred embodiments of this invention and are not for use in limiting the protection scope thereof. Any changes and modifications can be made by those skilled in the art without departing from the spirit of this invention and therefore should be covered within the protection scope as set by the appended claims.

The invention claimed is:

1. A video encoding method performed by at least one processor comprising:
    obtaining a first reference block of a first reference frame and a second reference block of a second reference frame for a current block by motion searching in a reference picture queue;
    obtaining a predicted block of the current block by using the first reference block and the second reference block;
    obtaining a first reference frame index based on a position of the first reference frame in the reference picture queue, obtaining a second reference frame index based on a position of the second reference frame in the reference picture queue, obtaining a first motion vector based on a position of the first reference block and obtaining a second motion vector based on a position of the second reference block;
    encoding only the first reference frame index and the first motion vector among the first reference frame index, the second reference frame index, the first motion vector, and the second motion vector; and generating a bitstream including the encoded first reference frame index and the encoded first motion vector.

2. The video encoding method of claim 1, wherein the second reference frame index and the second motion vector are not encoded, the second reference frame index and the second motion vector are not included in the bitstream.

3. A video decoding method performed by at least one processor comprising:

obtaining, from a bistream, a first reference frame index which is an index of a first reference frame and a first motion vector;

obtaining a second reference frame index which is an index of a second reference frame by using the first reference frame index;

obtaining a second motion vector regarding a second reference block of the second reference frame by using the first motion vector regarding a first reference block of the first reference frame;

obtaining the first reference block and the second reference block by using the first reference frame index, the second reference frame index, the first motion vector, and the second motion vector; and obtaining a predicted block of a current block by using the first reference block and the second reference block.

4. The video decoding method of claim 3, wherein the second motion vector is not obtained from the bistream.

5. The video decoding method of claim 3, wherein the second reference frame index is not obtained from the bistream.

6. A video decoding apparatus comprising:

at least one processor configured to:

obtain, from a bistream, a first reference frame index which is an index of a first reference frame and a first motion vector, obtain a second reference frame index which is an index of a second reference frame by using the first reference frame index, obtain a second motion vector regarding a second reference block of the second reference frame by using the first motion vector regarding a first reference block of the first reference frame, obtain the first reference block and the second reference block by using the first reference frame index, the second reference frame index, the first motion vector, and the second motion vector, and obtain a predicted block of a current block by using the first reference block and the second reference block.

\* \* \* \* \*